Aug. 12, 1969

G. A. KEMENY ET AL 3,461,190

METHOD OF AND APPARATUS FOR ESTABLISHING AND MAINTAINING AN
ATMOSPHERE CONTROLLED AS TO PRESSURE, TEMPERATURE, GAS
CONTENT AND RATE OF GAS FLOW, AND CLOSED AND
SEMI-CLOSED ARC HEATER LOOP
APPARATUS FOR USE THEREIN

Original Filed Aug. 20, 1964

INVENTORS
George A. Kemeny
& Peter F. Kienast

BY *Maury I. Hull*

ATTORNEY

United States Patent Office 3,461,190
Patented Aug. 12, 1969

3,461,190
METHOD OF AND APPARATUS FOR ESTABLISHING AND MAINTAINING AN ATMOSPHERE CONTROLLED AS TO PRESSURE, TEMPERATURE, GAS CONTENT AND RATE OF GAS FLOW, AND CLOSED AND SEMI-CLOSED ARC HEATER LOOP APPARATUS FOR USE THEREIN
George A. Kemeny, Franklin Township, Westmoreland County, and Peter F. Kienast, Pittsburgh, Pa., assignors to Westinghouse Electric Corporation, Pittsburgh, Pa., a corporation of Pennsylvania
Original application Aug. 20, 1964, Ser. No. 390,898, now Patent No. 3,371,189. Divided and this application July 24, 1967, Ser. No. 666,529
Int. Cl. F27b 21/00; F23l 9/04; F24h 3/14
U.S. Cl. 263—52
10 Claims

ABSTRACT OF THE DISCLOSURE

A gas is compressed at a desired rate, and the compressed gas heated to a desired temperature. A closed path is provided for the flow of the heated gas to provide an atmosphere in which metal may be worked, and a large portion of the gas is recycled through the closed path, while a relatively small portion is removed from the closed path at a rate sufficient to maintain substantially constant pressure and gas flow conditions. The method may include the additional step of admitting other gas to the closed path to provide a gas mixture, and may include the further step of utilizing heat from the removed portion to preheat the gas to be compressed and further heated.

This application is a division of copending application Ser. No. 390,898 filed Aug. 20, 1964, now Patent No. 3,371,189.

This invention relates to improvements in methods and apparatus for providing controlled atmospheres in closed and semi-closed loop systems, especially suitable for metal working in gases at high temperatures, and particularly to such loops using arc heaters for heating the gases.

As will be readily understood by those skilled in the art, in metal working it is necessary to raise metals to tempering, annealing, melting or reducing temperatures, and in some processes it is further necessary or desirable to control the specific atmosphere in which the metal is heated.

Apparatus suitable for practicing the methods of our invention employs an arc heater which passes the gas to be heated through an arc which rotates between water cooled electrodes. The high speed of rotation of the arc provides uniform enthalpy and temperature at the gas injector. The arc heater transforms electric energy to heat energy directly without the need for conventional heating elements or consumable electrodes. This makes it possible to achieve very high gas temperature without contamination. Since the arc heater is especially suited for high temperature operation, only a small quantity of gas flow is required to raise the operating temperature in the furnace to the required value thereby increasing the efficiency of the method and apparatus.

The apparatus is also especially suitable for use in systems or any application requiring high temperature gas flows, and is characterized by high efficiency of operation, continuous operation, temperature control in the furnace, pressure control in the furnace and throughout the system, the ability to produce temperatures required for a wide range of particular applications, and control of the specific atmosphere in the system.

To this end, the apparatus embodying our invention and suitable for practicing the method of our invention includes an arc heater the gas input to which is or may be supplied through a heat exchanger. The heated gas from the arc heater is supplied to means forming a closed head, the path forming means including a furnace portion of enlarged diameter for containing the metal or other substance to be heated, having a door for placing the metal inside the furnace. A temperature sensing device connected inside the furnace near the substance to be heated is connected to a control which automatically regulates the power into the arc heater and accordingly regulates the temperature of gas in the arc heater. Gas from the arc heater, after passing around the closed path and around the metal to be heated returns to a point in the closed channel or closed path near the point of injection, from whence a portion of it passes through the heat exchanger and is exhausted. The fraction of gas discharged from the main loop may be bled from any part of the main loop but for effciency reasons it is desirable that this gas be ejected from a location downstream of the furnace portion of the loop. A large portion of the gas is recycled.

In another embodiment of the invention, the portion of the gas removed from or allowed to escape from the closed path, after passing through the heat exchanger, is precooled and then passed through a dust separator or other filter and supplied back into the arc heater. This type of configuration is particularly attractive if the heated gas is sufficiently expensive to make it economically unattractive to waste a portion of the gas flow.

In both embodiments, an additional input or inputs are provided to the means forming the closed path for supplying another gas or other gases in addition to that heated by the arc heater, to provide an atmosphere having any desired ratio of gas content. Heat is transferred from the heated gas to the unheated gas by convection.

An object of our invention is to provide a new and improved method of establishing and maintaining an atmosphere controllable as to pressure, temperature, gas content, and rate of gas flow.

Another object is to provide new and improved apparatus for controlling an atmosphere, and offering advantages over any now existing in the art.

A further object of our invention is to provide new and improved closed and semi-closed loop apparatus employing an arc heater for heating metals in a controlled atmosphere.

An additional object is to provide a new and improved closed loop system in which gas, after passing around the metal or other surfaces to be heated in the furnace, is filtered and channeled back through an arc heater and thence recycled through the heating furnace.

Another object of our invention is to provide a heat treating apparatus wherein an arc heater is used to heat all these gases presently contemplated for this application.

Still a further object is to provide a new and improved heating furnace in which the atmosphere may be easily controlled.

These and other objects will become more clearly apparent after a study of the following specification, when read in conjunction with the accompanying drawings, in which:

FIGURE 1 is a view partially in cross-section of semi-closed loop arc heater apparatus according to our invention;

FIG. 2 is a view partially in cross-section of the preferred embodiment of a closed loop system embodying our invention; and FIG. 3 is a view of a simplified embodiment of our invention.

Referring now to the drawings, in which like reference numerals are used throughout to designate like parts, for a more detailed understanding of the invention, and in particular in FIG. 1 thereof, reference numeral 10 generally designates a heating furnace having a portion 11 of enlarged diameter with a door 12 therein; the substance to be treated, for example a metal, is indicated at 13, mounted upon a suitable saucer or other support 14. In the illustrative drawing of FIG. 1, gas flows from left to right and exits from the furnace 10 into a conduit 15 which, as shown, loops back and is connected with the entrance end of the furnace, providing a closed loop or closed path for the flow of gases. There is a chamber 16 of substantially enlarged diameter at the entrance end of the closed furnace loop, having a throat of substantially reduced diameter 17, having a gas inlet pipe 18 with a nozzle 19 closely adjacent the throat 17. Gas entering the furnace area from the nozzle 19 is the gas which has been heated by the arc heater generally designated 23. Arc heater 23 has been shown externally located with respect to the loop. Actually the arc heater is relatively small and can also be located in chamber 16. The gas from nozzle 19 passes up a relatively long portion 24 into the portion of enlarged diameter 11. It is seen that closely adjacent the nozzle 17 on the furnace side thereof is an additional gas inlet pipe 25 connected to a gas scource 26 shown in block form for convenience of illustration. It will be understood that the inlet pipe 25 may contain suitable valve means, and that the inlet itself may consist of separate holes or nozzles suitably directed, not shown for convenience of illustration; gas entering from the pipe 25 enters obliquely or tangentially to gas entering 24 at the nozzle 19, which assists in providing good mixing of the gases.

The aforementioned chamber 16 has a gas outlet conduit or pipe 28 communicating with a heat exchanger generally designated 29. Gas from conduit 28 after passing through the heat exchanger 29 is exhausted through the outlet pipe 30 which contains a suitable valve 31. The valve 31 is preferably a pressure-actuated valve for maintaining a substantially constant pressure in the furnace generally designated 10. It is seen that in the heat exchanger 29, heat from the gas passing through conduit 28 is transferred to a pipe or conduit 33 which supplies the input to the arc heater 23, conduit 33 being connected to receive the output of the compressor 34 connected to inlet pipe 35. Inlet pipe 35 may be used if air is to be drawn into the system or if a desired gas has to be pressurized by means of compressor 34. Alternately, if compressed gas available in cylinders or from other sources is to be heated in the arc heater, compressor 34 may be eliminated.

It is seen that the furnace generally designated 10 has a temperature sensing device 37 with a temperature responsive element 38 disposed in the furnace 10. The temperature sensing device 37 supplies an outlet by way of leads 41 and 42 to the power supply 43 which controls the power input to the arc heater. The temperature sensing device 37 accordingly is connected to automatically control the power input to the arc heater 23 to thereby maintain a constant predetermined gas temperature in the furnace 10. It will be readily understood that, in accordance with the rate of flow of gas or gases through the furnace, the temperature sensing device may be readjusted or reset to maintain a predetermined temperature, and the temperature sensing device and power supply 43 are understood to include means, not shown for convenience of illustration, for varying the temperature which is to be maintained within the furnace 10.

In the operation of the apparatus of FIG. 1, gas entering inlet pipe 35, after compression at 34 and being preheated by passing through the heat exchanger 29 is further heated in the arc heater 23. The operation of gas arc heaters is well known and need not be described herein in detail. For a fuller understanding of the manner in which electrical energy is directly converted to heat energy in an arc heater, reference may be had to a patent No. 3,048,736 entitled "Arc Chamber" by W. S. Emmerich, issued Aug. 7, 1962 and assigned to the assignee of the instant invention. The heated gas from arc heater 23 passes through the nozzle 19 into the injection or aspirator system where it mixes with the colder gas, which may include gas supplied from source 26, and induces the required flow velocity in the main heating loop including the furnace having the chamber 11. Proportional mixing of the high temperature gas from the arc heater and the other gas in the system will determine the furnace temperature. Material to be heated, illustrated generally at 13, is located in the furnace. The major portion of the gas will recycle due to the aspiration effect and will again be mixed with and heated by the gas from nozzle 19, the arc heater output. A pressure actuated valve 31 regulates the system by enabling some, or a small portion, of the gas to escape or be exhausted through a heat exchanger, thus preheating the gas being compressed into the arc heater. Due to the presence of the heat exchanger, less electrical input will be required to raise the gas to the required temperature, thus increasing the system efficiency. The temperature sensing device 37 including temperature sensing element 38 controls the input power to the arc heater 23 to achieve proper operating conditions. Preferably the furnace and if desired the entire recycling system has either brick lining, not shown for convenience of illustration, or water cooling, not shown for convenience of illustration, depending upon the operating temperature, any convenient arrangement being suitable.

It is seen, then, that the apparatus of FIG. 1 provides an integrated system for heating metals for tempering, annealing melting, or reducing, and provides an integrated system for any process requiring heated gas flow. The apparatus and system of FIG. 1 provide complete control of the atmosphere of the heating process, and in the semi-closed loop system of FIG. 1, the arc heater provides sufficient action to maintain the gas flow. The need for blowers and compressors in the high temperature loop is thereby eliminated.

The apparatus of FIG. 1 is suitable for practicing the method of our invention, defined and claimed hereinafter, for establishing and maintaining an atmosphere controlled as to pressure, temperature, gas composition, and rate of gas flow.

Particular reference is made now to FIG. 2, which shows closed loop apparatus according to our invention. The apparatus of FIG. 2 differs from that of FIG. 1 in that outlet pipe 30', corresponding to outlet pipe 30 of FIG. 1, supplies an input to a precooler 51, of any convenient design, which supplies an output by way of conduit 52 to a dust separator or other filter 53, the output of the dust separator or filter 53 being connected to the aforementioned input pipe, in this case pipe 35', supplying an input to the compressor 34.

In the apparatus of FIG. 2, gas discharge from the heat exchanger 29 is recycled through the compressor. Otherwise the operation of the apparatus of FIG. 2 is similar to the aforedescribed operation of the apparatus of FIG. 1.

In the apparatus of FIG. 2, where gas is supplied from source 26 to provide a mixture in furnace 10, a small portion of gas may be bled from the closed loop by bleeder 61 controlled by valve 62 by assist in maintaining constant pressure in the closed path and furnace. The system may be initially charged with gas or gases through valve 66.

Pressure level in the furnace in either embodiment can be of any desired level, including atmospheric pressure, which facilitates the charging operation.

Where air, or only one gas, is to constitute the atmosphere, inlet pipe 25 and source 26 may be omitted. Also, a gas mixture containing gases in desired ratio of composition, may be admitted to inlet pipes 35 and 35'. Particular reference is made now to FIG. 3. A simplified configuration utilizing an arc heater may consist of a chamber 70 into which the discharge from the nozzle 75 of the arc heater 71 is suitably directed to mix the gas volume in this chamber so as to obtain the desired pressure, temperature uniformity, and gas composition in that part of the chamber where heating or heat treatment is to occur. Material to be treated is symbolized at 74. Temperature sensing can be as shown in FIG. 1. Excess gts removal from this chamber and pressure control can be accomplished by a vent 72 located at any convenient location. Gas inside the chamber follows the path indicated at 73.

Whereas we have shown and described three new and novel embodiments of apparatus suitable for practicing the methods of our invention, it will be understood that changes may be made and equivalents substituted without departing from the spirit and scope of the invention.

We claim as our invention:

1. The method of establishing and maintaining an atmosphere controlled as to pressure, temperature, gas content and rate of gas flow which comprises the steps of compressing a gas at a predetermined rate, heating the compressed gas to a predetermined temperature without producing waste combustion products, providing a closed path for the flow of the heated gas, regulating the flow of the heated gas through said closed path, admitting other gas to the closed path at a predetermined rate in accordance with the rate of flow of the heated gas to provide a gas mixture in the closed path having gases mixed in a predetermined ratio, recycling a large portion of the gas mixture through the closed path, and removing a small portion of the gas mixture from the closed path at a predetermined pressure and at a predetermined rate to maintain the rate of gas flow and the pressure in the closed path at substantially desired levels.

2. The method according to claim 1 including in addition the steps of sensing the temperature of the gas mixture in the closed path and utilizing variations in the temperature of the mixture in the closed path to control the heating of the compressed gas.

3. The method of establishing and maintaining an atmosphere controlled as to pressure, temperature, gas mixture and rate of gas flow which comprises the steps of compressing a gas at a predetermined rate, heating the compressed gas without combustion under controllable conditions to a predetermined temperature, forming a closed path for the flow of the heated gas, said path including a metal treating portion adapted to have placed therein the metal to be treated, providing a predetermined rate of flow for the heated gas in the closed path, admitting other gas to the closed path at a predetermined rate in accordance with the rate of flow of the heated gas and at a position in the closed path after said gas is heated and before said heated gas reaches said metal treating portion to provide a gas mixture having predetermined proportions, sensing the temperature of the gas mixture in the closed path and utilizing variations in the temperature of the mixture to control the heating of the compressed gas, removing a predetermined amount of the gas mixture from the closed path at a predetermined pressure and rate of flow to maintain substantially constant the pressure and the rate of gas mixture flow in the closed path, and utilizing the heat of the gas removed from the closed path to preheat the compressed gas prior to subjecting the compressed gas to controlled heating conditions.

4. A method for establishing and maintaining an atmosphere controlled as to pressure, temperature, and rate of gas flow which comprises the steps of compressing gas at a predetermined rate, heating the compressed gas to a predetermined temperature without producing waste combustion products, providing a closed path for the flow of the heated gas, allowing the heated gas to flow at a predetermined rate through the closed path, recycling a relatively large portion of the gas around the closed path, and removing a relatively small portion of the gas from the closed path at a predetermined rate sufficient to maintain substantially constant pressure and gas flow conditions in the closed path.

5. The method of establishing and maintaining an atmosphere controlled as to pressure, temperature, and rate of gas flow which comprises the steps of compressing a gas at a predetermined rate, heating the compressed gas under controlled heat conditions to a predetermined temperature without producing waste combustion products, providing a closed path for the flow of the heated gas, allowing the heated gas to flow at a predetermined rate through the closed path, recycling the major portion of the gas through the closed path, removing a predetermined small portion of the gas from the closed path at a predetermined pressure and rate of flow to maintain the pressure and the rate of gas flow in the closed path substantially constant, sensing the temperature of the gas in the closed path, and utilizing variations in the sensed temperature to control the heating of the compressed gas prior to admission to the closed path.

6. The method of establishing and maintaining an atmosphere controlled as to pressure, temperature and rate of gas flow which comprises the steps of compressing a gas at a predetermined rate, heating the compressed gas without combustion to a predetermined temperature, providing a closed path for the flow of the heated gas, said path including a metal treating portion adapted to have placed therein the metal to be treated, allowing the heated gas to flow at a predetermined rate through the closed path, recycling a first large portion of the gas through the closed path, removing a portion of the gas small relative to the first named large portion from the closed path at a predetermined pressure and rate of flow to maintain the pressure and rate of flow in the closed path substantially constant, and utilizing the heat of the portion of the gas removed from the closed path to preheat the compressed gas prior to heating to said predetermined temperature.

7. The method of establishing and maintaining an atmosphere controlled as to pressure, temperature, and rate of gas flow which comprises the steps of compressing a gas at a predetermined rate, heating the compressed gas to a predetermined temperature without producing waste combustion products, providing a closed path for the flow of the heated gas, providing a predetermined rate of flow for the heated gas in the closed path, recycling the major portion of the gas in the closed path, and allowing a predetermined small portion of gas to escape from the closed path at a predetermined rate of flow and at a predetermined pressure to maintain the pressure and rate of gas flow in the closed path substantially constant.

8. The method according to claim 7 which includes the additional step of utilizing the heat of the portion of gas in the closed path which is allowed to escape to preheat the compressed gas prior to heating the compressed gas to said predetermined temperature.

9. The method for establishing and maintaining an atmosphere controlled as to pressure, temperature, gas content and rate of gas flow which comprises the steps of compressing a gas at a predetermined rate, heating the compressed gas under controllable heat conditions to a predetermined temperature, providing a closed path for the heated gas, allowing the heated gas to flow at a predetermined rate through the closed path, recycling the major portion of the gas around the closed path, sensing the temperature of the gas in the closed path, utilizing variations in said last named temperature to control the degree of heating of the compressed gas, allowing a small portion of the gas to escape from the closed path at a predetermined rate, utilizing the heat of the escaped portion of the gas to preheat the compressed gas prior to heating to said predetermined temperature, cooling and filtering the escaped portion of the gas after heat transfer to the compressed gas, recompressing the filtered gas, reheating the filtered gas to said predetermined temperature and thereafter reapplying said filtered gas to the closed path.

10. The method of establishing and maintaining an atmosphere controlled as to temperature, pressure, gas content and rate of gas flow which comprises the steps of heating a gas to a predetermined temperature, providing a closed path for the heated gas, allowing the heated gas to flow at a predetermined rate through the closed path, sensing the temperature of the gas in the closed path and utilizing variations in said last named temperature to control the heating of the compressed gas, recycling the major portion of the gas through the closed path, removing a small portion of the gas from the closed path at a predetermined rate, cooling and filtering the removed portion of the gas and recycling the filtered gas after heating to said predetermined temperature into said closed path.

References Cited
UNITED STATES PATENTS 1,524,340    1/1925    Darrah.
3,146,821    9/1964    Wuetig _____ 431—115 X FREDERICK L. MATTESON, JR., Primary Examiner E. G. FAVORS, Assistant Examiner U.S. Cl. X.R.

219—383; 263—19